(12) United States Patent
Baig et al.

(10) Patent No.: US 12,280,678 B2
(45) Date of Patent: Apr. 22, 2025

(54) POWER AND ENERGY MANAGEMENT FOR DISTRIBUTED HYBRID PROPULSION

(71) Applicant: RTX Corporation, Farmington, CT (US)

(72) Inventors: Zubair A. Baig, South Windsor, CT (US); Martin Amari, Glastonbury, CT (US); Tyler W. Hayes, Rockford, IL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/330,567

(22) Filed: Jun. 7, 2023

(65) Prior Publication Data

US 2024/0408979 A1    Dec. 12, 2024

(51) Int. Cl.
*B60K 6/42*    (2007.10)
*B60L 50/16*    (2019.01)

(52) U.S. Cl.
CPC ........... *B60L 50/16* (2019.02); *B60L 2200/10* (2013.01)

(58) Field of Classification Search
CPC ...................................................... B60L 50/16
See application file for complete search history.

(56) References Cited

U.S. PATENT DOCUMENTS

| | | | |
|---|---|---|---|
| 10,759,540 B2 | 9/2020 | Long | |
| 10,814,991 B2 | 10/2020 | Shah et al. | |
| 10,855,214 B2 | 12/2020 | Kheraluwala et al. | |
| 11,401,041 B2 | 8/2022 | Baig et al. | |
| 11,520,362 B2 | 12/2022 | Dasgupta et al. | |
| 2011/0100735 A1* | 5/2011 | Flett | B60L 50/13 180/65.285 |
| 2016/0023773 A1* | 1/2016 | Himmelmann | H02M 5/458 903/903 |
| 2016/0304214 A1* | 10/2016 | Himmelmann | F02C 6/206 |
| 2017/0234285 A1* | 8/2017 | Huh | H02J 7/1423 123/179.4 |
| 2018/0265206 A1* | 9/2018 | Himmelmann | B64D 27/10 |
| 2018/0291807 A1 | 10/2018 | Dalal | |
| 2019/0296546 A1* | 9/2019 | Smith | H02M 3/04 |
| 2022/0185497 A1 | 6/2022 | Barraco et al. | |

FOREIGN PATENT DOCUMENTS

EP    2995555 A1    3/2016

OTHER PUBLICATIONS

Search Report issued in European Patent Application No. 24180915.1; Application Filing Date Jun. 7, 2024; Date of Mailing Sep. 27, 2024 (8 pages).

* cited by examiner

*Primary Examiner* — Jared Fureman
*Assistant Examiner* — Esayas G Yeshaw
(74) *Attorney, Agent, or Firm* — CANTOR COLBURN LLP

(57) ABSTRACT

A distributed hybrid propulsion system is provided and includes an engine assembly that includes an engine, which is non-propulsive, an energy storage element, a motor-generator and a common bus to which the engine assembly, the energy storage element, the motor-generator and the controller are connected. The common bus includes bi-directional power flow control elements, which are controllable to manage bi-directional power flow between the engine assembly, the energy storage element and the motor-generator.

20 Claims, 2 Drawing Sheets

POWER AND ENERGY MANAGEMENT FOR DISTRIBUTED HYBRID PROPULSION

BACKGROUND

The present disclosure relates to aircraft and, in particular, to power and energy management for distributed hybrid propulsion systems on an aircraft.

The term hybrid power generally refers to combinations of different technologies to produce power. For example, in power engineering, hybrid power can refer to a combination of power drawn from a gas turbine engine and power drawn from batteries. The advantage of hybrid power is that one power generation mode can supplement or replace the other, to address current conditions, to increase efficiencies and to decrease emissions. For example, in an aircraft, battery power can be used to supplement gas turbine engine power during high-power flight regimes or to replace a gas turbine engine that is inoperative. Conversely, the gas turbine engine can be used to recharge the battery.

SUMMARY

According to an aspect of the disclosure, a distributed hybrid propulsion system is provided and includes an engine assembly that includes an engine, which is non-propulsive, an energy storage element, a motor-generator and a common bus to which the engine assembly, the energy storage element, the motor-generator and the controller are connected. The common bus includes bi-directional power flow control elements, which are controllable to manage bi-directional power flow between the engine assembly, the energy storage element and the motor-generator.

In accordance with additional or alternative embodiments, the engine assembly includes an active rectifier and starter and an engine-dedicated motor-generator connected to the common bus via the active rectifier and starter.

In accordance with additional or alternative embodiments, the engine assembly further includes two or more energy storage elements and two or more motor-generators.

In accordance with additional or alternative embodiments, the energy storage element includes a first DC/DC converter and one or more batteries respectively connected to the common bus via the first DC/DC converter.

In accordance with additional or alternative embodiments, the energy storage element includes a second DC/DC converter and one or more capacitors respectively connected to the common bus via the second DC/DC converter.

In accordance with additional or alternative embodiments, the engine assembly further includes one or more rotors, each of which is drivable by the motor-generator to generate thrust and an active rectifier and motor controller by which the motor-generator is connected to the common bus.

In accordance with additional or alternative embodiments, the bi-directional power flow control elements include multiple switches disposed along the common bus and controllable to open to prevent power flow and to close to permit power flow.

In accordance with additional or alternative embodiments, the multiple switches include at least a first switch between the engine assembly and the common bus, a second switch between the energy storage element and aircraft loads and a third switch between the motor-generator and each of the engine assembly and the energy storage element.

According to an aspect of the disclosure, a distributed hybrid propulsion system of a vehicle is provided and includes an engine assembly that includes an engine, which is non-propulsive, an energy storage element, a motor-generator, a controller and a common bus to which the engine assembly, the energy storage element, the motor-generator and the controller are connected. The common bus includes bi-directional power flow control elements. The controller is operably coupled with the bi-directional power flow control elements to manage bi-directional power flow between the engine assembly, the energy storage element and the motor-generator.

In accordance with additional or alternative embodiments, the vehicle is an aircraft for which the engine does not generate thrust and the distributed hybrid propulsion system further includes one or more rotors, each of which is drivable by the motor-generator to generate thrust.

In accordance with additional or alternative embodiments, the engine assembly includes an active rectifier and starter, the engine and an engine-dedicated motor-generator connected to the common bus via the active rectifier and starter.

In accordance with additional or alternative embodiments, the engine is a gas turbine engine.

In accordance with additional or alternative embodiments, the engine assembly further includes two or more energy storage elements and two or more motor-generators.

In accordance with additional or alternative embodiments, the energy storage element includes a first DC/DC converter and one or more batteries respectively connected to the common bus via the first DC/DC converter.

In accordance with additional or alternative embodiments, the energy storage element includes a second DC/DC converter and one or more capacitors respectively connected to the common bus via the second DC/DC converter.

In accordance with additional or alternative embodiments, the distributed hybrid propulsion system further includes one or more rotors, each of which is drivable by the motor-generator to generate thrust and an active rectifier and motor controller by which the motor-generator is connected to the common bus.

In accordance with additional or alternative embodiments, the bi-directional power flow control elements include multiple switches disposed along the common bus and controllable by the controller to open to prevent power flow and to close to permit power flow.

In accordance with additional or alternative embodiments, the multiple switches include at least a first switch between the engine assembly and the common bus, a second switch between the energy storage element and aircraft loads and a third switch between the motor-generator and each of the engine assembly and the energy storage element.

According to an aspect of the disclosure, a method of operating a distributed hybrid propulsion system of a vehicle is provided and includes connecting an engine assembly that includes an engine, which is non-propulsive, an energy storage element and a motor-generator to a common bus comprising bi-directional power flow control elements and controlling the bi-directional power flow control elements to manage bi-directional power flow between the engine assembly, the energy storage element and the motor-generator.

In accordance with additional or alternative embodiments, the vehicle is an aircraft for which the engine does not generate thrust and the distributed hybrid propulsion system further includes one or more rotors, each of which is drivable by the motor-generator to generate thrust.

Additional features and advantages are realized through the techniques of the present disclosure. Other embodiments and aspects of the disclosure are described in detail herein and are considered a part of the claimed technical concept.

For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

In a serial hybrid power and propulsion system, power is distributed from a power source to a propulsor to generate thrust. In such a system, power can be generated or consumed at either end of the system. Managing power demands and distribution can thus improve system operations and functionality. In addition, bi-directional power flows in serial hybrid power and propulsion systems allows for increased versatility. For example, fewer generators may be required because each generator may supply a common bus from which power is distributed. Further, additional components (e.g., batteries, fuel cells, motors, etc.) may all be connected and can operate as generators, power sources, sinks or loads. As such, a stable electrical environment can be achieved while allowing for modularity.

Thus, as will be described below, power and energy management for a distributed hybrid propulsion system of an aircraft is provided with bi-directional availability of power. In the system, a power generator can be a power consumer or power generator. Further, the bi-directional power flow through various paths in the system can eliminate a need for extra connections or components. Energy management in the system is achieved through coordination of rectifiers and a primary controller. A thermal engine (i.e., a gas turbine engine), a generator, fuel cells and batteries may be connected into the same common bus, and the rectifiers and the primary controller may operate sourcing and regulating of the active sources (e.g., thermal engine, generator, fuel cells, batteries, etc.) concurrently, thus allowing for greater power distribution to accommodate more configurations and/or operational demands. In addition, the use of direct current (DC) power sources (as compared to alternating current (AC) power sources) allows for easier balancing of loads and demand.

Figure 1:
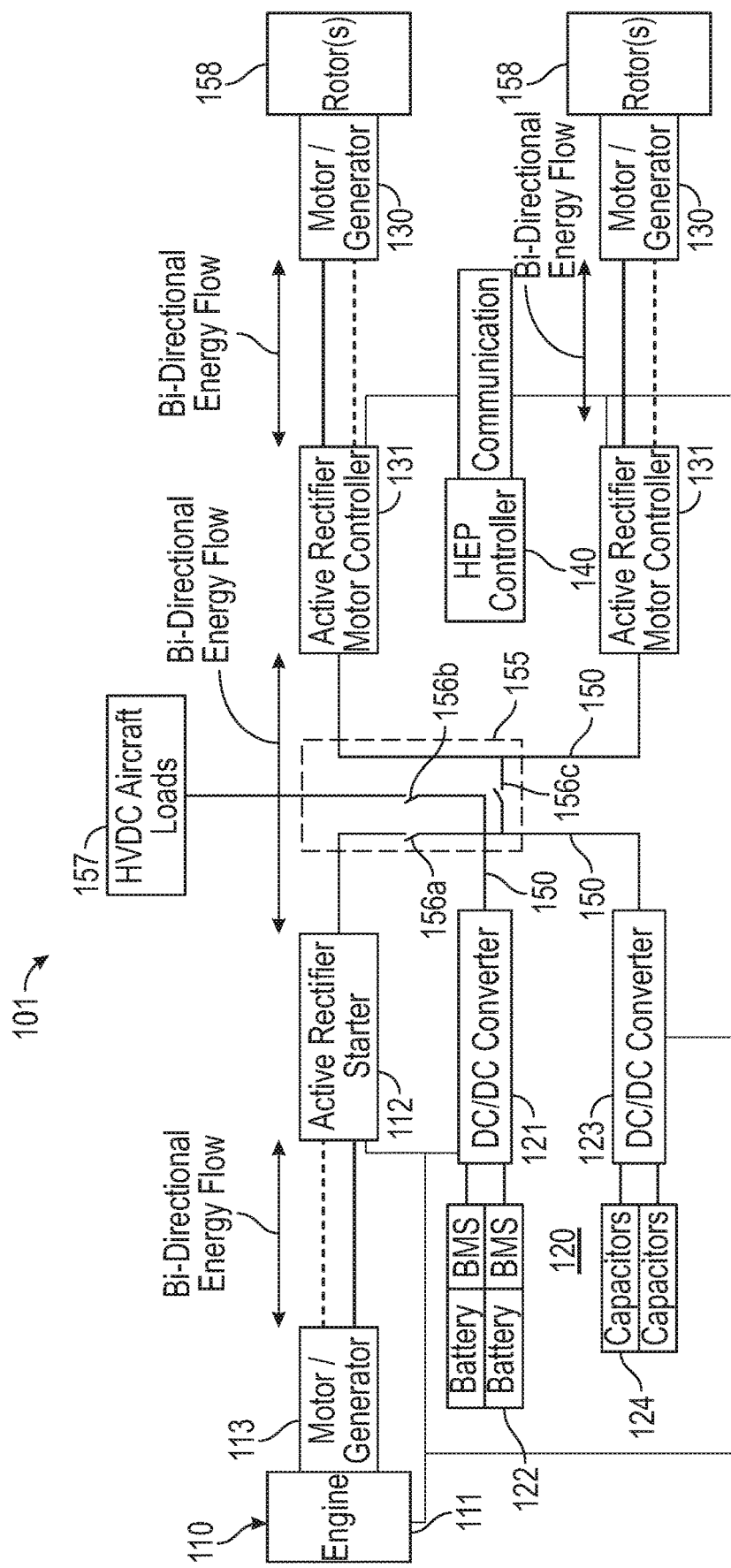
FIG. 1 is a schematic illustration of a distributed hybrid propulsion system of a vehicle in accordance with embodiments.

With reference to FIG. 1, a distributed hybrid propulsion system 101 is provided for use with a vehicle, such as an aircraft. The distributed hybrid propulsion system 101 includes an engine assembly 110. The engine assembly 110 includes an engine 111, such as a gas turbine engine. In some embodiments, the engine 111 may be configured to provide propulsion. In some embodiments, the engine 111 may be configured to be non-propulsive, such that the engine 111 does not generate motive power for the vehicle. For example, the engine 111 can be provided as an auxiliary power unit (APU) or a gas turbine engine of an aircraft and thus is not configured to generate thrust. The distributed hybrid propulsion system 101 further includes an energy storage element 120, a motor-generator 130 that provides for generation of propulsive thrust for the vehicle by driving one or more rotors 158, a controller 140 and a common bus 150. The engine assembly 110, the energy storage element 120, the motor-generator 130 and the controller 140 are each connected to the common bus 150. The common bus 150 includes bi-directional power flow control elements 155. The controller 140 is operably coupled with and disposed in signal communication with each of the bi-directional power flow control elements 155 to manage bi-directional power flow between the engine assembly 110, the energy storage element 120 and the motor-generator 130. Each of the energy storage element 120 and the motor-generator 130 can be plural in number.

Each of the one or more motor-generators 130 can be operably coupled to one or more rotors 158, each of which is configured to generate propulsive power (e.g., thrust and/or lift) to power an aircraft. In at least one embodiment, a single motor-generator 130 can be configured to power two rotors 158, though this is not intended to be so limiting and fewer or additional rotors 158 may be powered by a single motor-generator 130. The rotor(s) 158 may include ducted and/or unducted rotors. For example, the rotor(s) 158 may include a ducted fan configured to generate thrust (e.g., substantially horizontal power) and/or lift (e.g., substantially vertical power).

The controller 140 can be provided as a hybrid electric propulsion (HEP) controller and can include a processor, a memory unit, an input/output (I/O) unit by which the processor is communicative with each element of the distributed hybrid propulsion system and a servo element configured to control operations of the bi-directional power flow control elements 155 according to instructions issued by the processor. The memory unit has executable instructions stored thereon. The executable instructions are readable and executable by the processor. When the executable instructions are read by the processor, the processor is caused to control each of the bi-directional power flow control elements 155 via the networking unit and the servo element to manage bi-directional power flow between the engine assembly 110, the energy storage element 120 and the motor-generator 130.

The engine assembly 110 includes an active rectifier and starter 112, the engine 111 and an engine-dedicated motor-generator 113, which is connected to the common bus 150 via the active rectifier and starter 112.

The energy storage element 120 includes a battery assembly and a capacitor assembly. The battery assembly of the energy storage element 120 includes a first DC/DC converter 121 and one or more batteries 122 that are respectively connected to the common bus 150 via the first DC/DC converter 121. The capacitor assembly of the energy storage element 120 includes a second DC/DC converter 123 and one or more capacitors 124 that are respectively connected to the common bus 150 via the second DC/DC converter 123.

The distributed hybrid propulsion system 101 further includes an active rectifier and motor controller 131 by which the motor-generator 130 is connected to the common bus 150. In the case in which the motor-generator 130 is plural in number (e.g., a hybrid propulsion system 101 with two (2) or more motor-generators 130), the active rectifier and motor controller 131 can also be plural in number, with each motor-generator 130 being connected to the common bus 150 via a corresponding active rectifier and motor controller 131.

The bi-directional power flow control elements 155 include multiple switches that are disposed along the common bus 150. Each of the multiple switches is controllable by the controller 140 to open to prevent power flow and to close to permit power flow. The multiple switches include at least a first switch 156a electrically interposed between the engine assembly 110 and the common bus 150, a second switch 156b electrically interposed between the energy storage element 120 and aircraft loads 157 and a third switch 156c electrically interposed between the motor-generator 130 and each of the engine assembly 110 and the energy storage element 120.

In accordance with embodiments, the controller 140 utilizes real-time system models of the engine 111, the motor-generator 130 and each of the electrical components to determine optimal time and power demands to control operations of the distributed hybrid propulsion system 101. Such operations can be prescribed by an operator or the controller 140 can make real-time decisions autonomously (e.g., without operator input) to provide for an optimal balance of power and to thereby push the distributed hybrid propulsion system 101 toward peak efficiency.

For example, during take-off, given an energy budget of fuel for the engine 111 and stored electrical energy in the energy storage element 120, the controller 140 can decide how to balance usage of the engine power of the engine 111 versus battery power of the one or more batteries 122 to extend an aircraft range. If the controller 140 determines the engine 111 is not running at a peak efficiency curve thereof, the controller 140 can decrease battery usage thus pushing the engine 111 more towards a peak efficiency operating point (i.e., by closing the first switch 156a to draw electrical power from the motor/generator 113 of the engine 111). Later, in a cruise portion of flight, the controller 140 can balance power usage to push the engine 111 towards optimal operation and setting a charge rate for the one or more batteries 122 that balances power consumption of the distributed hybrid propulsion system 101 such that the engine 111 again operates at an optimal operation point (i.e., by closing the third switch 156c and directing electrical power toward charging the one or more batteries 122).

Figure 2:
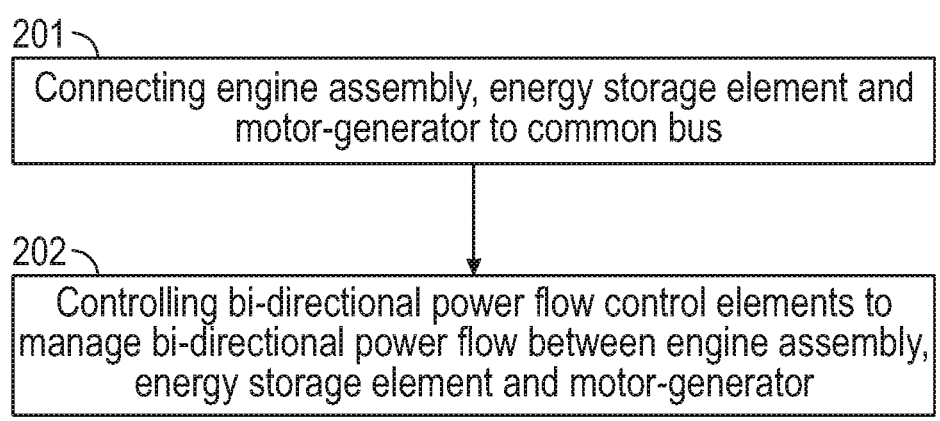
FIG. 2 is a flow diagram illustrating a method of operating a distributed hybrid propulsion system of a vehicle in accordance with embodiments.

With reference to FIG. 2, a method of operating a distributed hybrid propulsion system of a vehicle, such as the distributed hybrid propulsion system 101 of FIG. 1, is provided. The method includes connecting an engine assembly that includes an engine, which does not generate motive power for the vehicle, an energy storage element and a motor-generator to a common bus including bi-directional power flow control elements (block 201) and controlling the bi-directional power flow control elements to manage bi-directional power flow between the engine assembly, the energy storage element and the motor-generator (block 202).

Technical effects and benefits of the present disclosure are the provision of a distributed hybrid propulsion system of a vehicle in which bi-directional power flow between an engine assembly, an energy storage element and a motor-generator is managed.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A distributed hybrid propulsion system, comprising:
   an engine assembly comprising an engine, which is non-propulsive;
   a first active rectifier;
   an energy storage element;
   a converter;
   a motor-generator;
   a second active rectifier;
   a common bus to which the engine assembly is connected via the first active rectifier, to which the energy storage element is connected via the converter and to which, the motor-generator is connected via the second active rectifier; and
   bi-directional power flow control elements, which are controllable to manage bi-directional power flow between the engine assembly, the energy storage element and the motor-generator,
   the bi-directional power flow elements comprising:
   a first switch between the first active rectifier and each of the converter and the second active rectifier;
   a second switch between the converter and loads; and
   a third switch between the second active rectifier and each of the converter and the first active rectifier.

2. The distributed hybrid propulsion system according to claim 1, wherein the engine assembly comprises an engine-dedicated motor-generator connected to the common bus via the first active rectifier.

3. The distributed hybrid propulsion system according to claim 1, further comprising two or more energy storage elements and two or more motor-generators.

4. The distributed hybrid propulsion system according to claim 1, wherein the converter comprises a first DC/DC converter and the energy storage element comprises one or more batteries respectively connected to the common bus via the first DC/DC converter.

5. The distributed hybrid propulsion system according to claim 1, wherein the converter comprises a second DC/DC converter and the energy storage element comprises one or more capacitors respectively connected to the common bus via the second DC/DC converter.

6. The distributed hybrid propulsion system according to claim 1, further comprising one or more rotors, each of which is drivable by the motor-generator to generate thrust.

7. The distributed hybrid propulsion system according to claim 1, wherein the first, second and third switches are disposed along the common bus and are controllable to open to prevent power flow and to close to permit power flow.

8. The distributed hybrid propulsion system according to claim 1, wherein:
   the converter is provided as two parallel converters for two parallel energy storage elements and the second active rectifier is provided as two parallel second active rectifiers for two parallel motor-generators, the first switch is between the first active rectifier and each of the two parallel converters and the two parallel second active rectifiers;

the second switch is between the two parallel converters and the loads; and the third switch is between the two parallel second active rectifiers and each of the two parallel converters and the first active rectifier.

9. A distributed hybrid propulsion system of a vehicle, the distributed hybrid propulsion system comprising:

an engine assembly comprising an engine, which is non-propulsive;

a first active rectifier;

an energy storage element;

a converter;

a motor-generator;

a second active rectifier;

a controller;

a common bus to which the engine assembly is connected via the first active rectifier, to which the energy storage element is connected via the converter, to which, the motor-generator is connected via the second active rectifier and to which the controller is connected; and bi-directional power flow control elements, the controller being operably coupled with the bi-directional power flow control elements to manage bi-directional power flow between the engine assembly, the energy storage element and the motor-generator, and the bi-directional power flow elements comprising:

a first switch between the first active rectifier and each of the converter and the second active rectifier;

a second switch between the converter and loads; and a third switch between the second active rectifier and each of the converter and the first active rectifier.

10. The distributed hybrid propulsion system according to claim 9, wherein the vehicle is an aircraft for which the engine does not generate thrust and the distributed hybrid propulsion system further includes one or more rotors, each of which is drivable by the motor-generator to generate thrust.

11. The distributed hybrid propulsion system according to claim 9, wherein the engine assembly comprises an engine-dedicated motor-generator connected to the common bus via the first active rectifier.

12. The distributed hybrid propulsion system according to claim 9, wherein the engine is a gas turbine engine.

13. The distributed hybrid propulsion system according to claim 9, further comprising two or more energy storage elements and two or more motor-generators.

14. The distributed hybrid propulsion system according to claim 9, wherein the converter comprises a first DC/DC converter and the energy storage element comprises one or more batteries respectively connected to the common bus via the first DC/DC converter.

15. The distributed hybrid propulsion system according to claim 9, wherein the converter comprises a second DC/DC converter and the energy storage element comprises one or more capacitors respectively connected to the common bus via the second DC/DC converter.

16. The distributed hybrid propulsion system according to claim 9, further comprising one or more rotors, each of which is drivable by the motor-generator to generate thrust.

17. The distributed hybrid propulsion system according to claim 9, wherein the first, second and third switches are disposed along the common bus and are controllable by the controller to open to prevent power flow and to close to permit power flow.

18. The distributed hybrid propulsion system according to claim 9, wherein:

the converter is provided as two parallel converters for two parallel energy storage elements and the second active rectifier is provided as two parallel second active rectifiers for two parallel motor-generators, the first switch is between the first active rectifier and each of the two parallel converters and the two parallel second active rectifiers;

the second switch is between the two parallel converters and the loads; and the third switch is between the two parallel second active rectifiers and each of the two parallel converters and the first active rectifier.

19. A method of operating a distributed hybrid propulsion system of a vehicle, the method comprising:

disposing first, second and third switches along a common bus;

connecting an engine assembly comprising an engine, which is non-propulsive, to the common bus via a first active rectifier;

connecting an energy storage element to the common bus via a converter;

connecting a motor-generator to the common bus via a second active rectifier;

interposing the first switch between the first active rectifier and each of the converter and the second active rectifier;

interposing the second switch between the converter and loads;

interposing the third switch between the second active rectifier and each of the converter and the first active rectifier; and controlling the first, second and third switches to manage bi-directional power flow between the engine assembly, the energy storage element and the motor-generator.

20. The method according to claim 19, wherein the vehicle is an aircraft for which the engine does not generate thrust and the distributed hybrid propulsion system further includes one or more rotors, each of which is drivable by the motor-generator to generate thrust.

* * * * *